United States Patent

[11] 3,595,394

[72] Inventor Frank Charles Blight
 Sunbury-on-Thames, Middlesex, England
[21] Appl. No. 803,379
[22] Filed Feb. 28, 1969
[45] Patented July 27, 1971
[73] Assignee The Permutit Company Limited
 London, England
[32] Priority Feb. 29, 1968
[33] Great Britain
[31] 9907/68

[54] WATER-DEMINERALIZING APPARATUS WITH A CENTRAL REGENERANT COLLECTING AND DISTRIBUTING DEVICE
4 Claims, 1 Drawing Fig.

[52] U.S. Cl.................................................. 210/134,
 210/136, 210/279
[51] Int. Cl...................................................B01d 23/10,
 B01d 23/24

[50] Field of Search........ ................................ 210/30, 32,
 34, 35, 134, 136, 279, 289, 290

[56] References Cited
UNITED STATES PATENTS
2,666,741 1/1954 McMullen.................... 210/290 X
2,268,607 1/1942 McGill ......................... 210/279 X
3,384,240 5/1968 Berardi......................... 210/279 X Primary Examiner—Samih N. Zaharna
Attorney—Larson, Taylor & Hinds ABSTRACT: In the regeneration of a mixed bed of cation and anion resins which are separated into layers, these being individually regenerated, the effluent regenerant of the anion layer is collected at points above the interface between the layers and the regenerant of the cation layer is introduced at points below the interface. A central device for collecting and distributing regenerant has inlets on the upper side and outlets on the under side, and all the inlets and outlets are controlled by nonreturn valves.

PATENTED JUL 27 1971
3,595,394
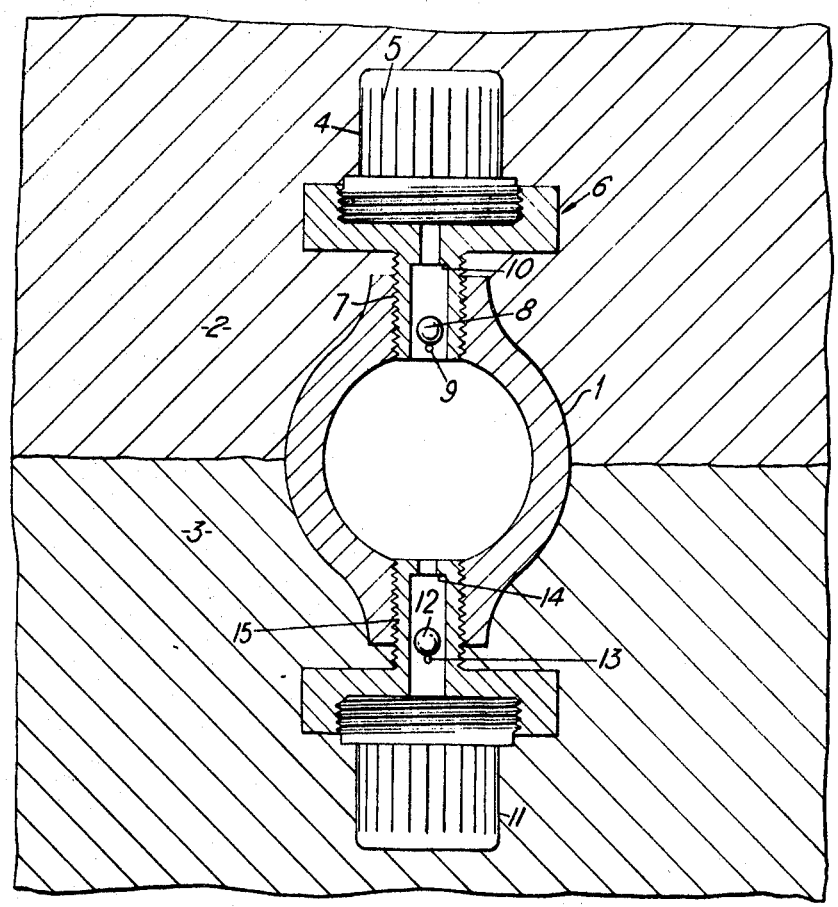

WATER-DEMINERALIZING APPARATUS WITH A CENTRAL REGENERANT COLLECTING AND DISTRIBUTING DEVICE

This invention relates to the regeneration of a bed of mixed cation-exchange and anion-exchange resins by forming the bed into layers, the anion layer being above the caution layer, and passing an appropriate regenerant downwards through each layer.

In the demineralization of water, particularly for the treatment of boiler feed-water, which must be of very high purity indeed, it is common practice to pass the water through such a bed of mixed cation-exchange and anion-exchange resins, often after previous passage through a bed of cation-exchange resin. The effluent water is of high but not perfect quality. Measurements of its electrical conductivity indicate impurities amounting to from 5 to 10 micrograms per litre. While all impurities are undesirable, neutral salts are less harmful than acid or alkali.

The standard method of regenerating a mixed bed is based upon difference in the densities of anion and cation resins, the cation resins being the denser. The whole bed is suspended by upward flow of water so that it becomes stratified into an upper anion layer and lower cation layer and then allowed to settle so that the bed consists of the two layers; the two layers are independently regenerated; some of the liquid is drained off to leave an air space above the bed, which is still immersed in liquid; air is blown upwards through the bed to suspend it and mix the resins; and the air flow is cut off, whereupon the resins immediately settle to reform the mixed bed.

In order to effect the regeneration a central device for distributing and collecting liquid is provided in the vessel that contains the bed, this device being arranged at the height of the interface between the anion and cation resins when these have been separated into layers. Commonly caustic soda or other regenerant for the anion resin is introduced into the top of the vessel and leaves through the central device. Acid for regenerating the cation resin is introduced through the central device and removed at the bottom of the vessel. Although such downward flow of each regenerant is not essential since the acid can flow upwards through the cation layer, it is highly desirable, and the invention is concerned with methods and apparatus in which each regenerant flows downwards.

It is important that each regenerant should come into contact only with the layer is regenerates and not with the other layer. The cation resin is commonly regenerated by sulfuric acid, which on coming into contact with the anion resin converts this into the bisulphate form and moreover causes organic matter to precipitate in the beads of anion resin. When the layers have been mixed, and water to be treated flows downwards, the bisulphate form of the anion resin slowly hydrolyses to yield free sulfuric acid, and organic acids that have been precipitated inside the anion resin beads also tend to bleed out of them. Now some of this contaminated anion resin may be at the bottom of the bed so that the acids pass straight into the effluent water. To avoid this as far as possible, acid must be prevented from coming into contact with the anion resin. This can largely be achieved by passing water downwards through the whole bed during the regeneration with acid, the water thus opposing any tendency of acid to move upwards. Even so, contact of acid with the anion layer occurs from time to time. Specifically the interface may vary in position because of inadequate separation of the resins, so that the acid enters the anion layer; and there is some diffusion of acid upwards.

The anion resin is normally regenerated by caustic soda. Contact of caustic soda with the cation resin is not so harmful from the point of view of the purity of the effluent water but is nevertheless undesirable. The reason varies with the order of the regeneration. If the cation resin is regenerated before the anion resin and so is in the hydrogen form when the anion resin is regenerated, caustic soda entering the top of the cation layer exchanges sodium ions for hydrogen. This involves a loss of caustic soda from the effluent regenerant which may be as much as 10 percent. Often, in a large plant, the effluent regenerant flows onwards to initiate the regeneration of another bed of anion resin, so the loss of caustic soda is economically serious.

If the anion resin is regenerated first, the top of the cation layer collects additional sodium from the caustic soda, and regenerate subsequently used to regenerate the cation layer must remove this additional sodium, with consequent loss of acid. Not only may this loss be important in a large plant in which the effluent acid is used to initiate regeneration of another cation bed, but also the transfer of the sodium is highly undesirable.

The entry of caustic soda into the cation layer can be prevented to some extent by upward flow of water through the cation layer into the central device during the downward flow of the caustic soda, but the rate of upward flow of the caustic soda, but the rate of upward flow must be much greater than the similar rate of downward flow during the regeneration of the cation layer, and the upward flow is never wholly effective.

The reason why some caustic soda always comes into contact with the cation layer is to be found in the geometry of the central device. This is formed by a grid of pipes, most commonly consisting of a diametral header from each side of which lateral pipes extend to close the wall of the vessel. Now resin must of course be prevented from passing into the pipes, and normally strainers through which liquid but not resin can pass are provided at appropriate spacing along the pipes (the laterals in the common form of device) to allow the liquid to enter and leave the device. The strainers may be fabric stretched over openings in the upper, or more usually the lower, surface of the pipe, but preferably are thimbles with slits and extend either upwards or downwards into the one or other resin layer. Because of the relative importance of preventing contact of acid with the anion layer, the strainers usually extend downwards. In order to reach them the caustic soda must pass through the interface, and in fact it passes somewhat beyond each strainer because the downwardly flowing caustic soda will not suddenly turn through 90° to enter a strainer, and the upwardly flowing water tends to flow to the strainers and not to the spaces between, thus leaving pockets of caustic soda between adjacent strainers. Another reason why the caustic soda solution tends to enter the cation resin is that it is denser than water.

It will be seen therefore that with the most efficient central devices hitherto devised, and with the use of flows of water opposing the entry of regenerant into the wrong layer, impurities are introduced into the treated water after regeneration of the bed. Our object is to reduce the amount of these impurities.

The invention consists broadly in collecting the effluent regenerant of the anion layer at points above the interface and introducing the regenerant of the cation layer at points below the interface. In consequence the resins in a central zone on either side of the interface will not be regenerated, but when the layers have been remixed the presence of some unregenerated resin is immaterial. The advantage is obtained that there is no or substantially no sulfate ion in the anion resin and no or substantially no sodium ion in the cation resin, and the quality of the treated water is improved.

In order to carry out the process modification of the conventional collecting and distributing device is necessary. According to the invention inlets to the central collecting and distributing device in the vessel are provided on the upper side and outlets on the under side. All the inlets and outlets are controlled by nonreturn valves and those on the upper side are formed by strainers so as to prevent resin from entering the central device. Although in operation there is no flow of liquid into the central device through the outlets on the under side, it is desirable that these should also be formed by strainers, first in case reverse flow should occur as a result of some accident and second because strainers of suitable construction serve the useful purpose of causing the acid regenerant to enter the cation layer laterally and not merely in downward streams.

The preferred construction is shown in the accompanying drawing. In this one of the lateral pipes 1 of a typical grid is shown in section. The grid, which is connected to a pipe passing through the wall of the vessel that houses the bed of resins, intersects the interface of the layers of anion resin 2 and cation resin 3 when these have been stratified.

A tubular strainer 4 with slits 5 parallel to the axis is provided on the upper side of the pipe to allow liquid to pass into the pipe while retaining resin. This strainer is carried by a socket 6 which has a hollow threaded spigot 7 that engages a threaded opening in the pipe 1. The spigot houses a ball 8 which is retained by a cross pin 9 and, when liquid under pressure is introduced onto the pipe 1, engages a seat 10 on the socket 6.

On the underside of the pipe 1 there is a similar strainer 11, the only difference being that a ball 12 which stops reverse flow through this is retained by a cross pin 13 on the side of the ball remote from the pipe and engages a seat 14 at the end of the spigot, shown at 15.

It will be understood that t strainers 4 and 11 are arranged at appropriate spacing along each lateral pipe.

Although the utility of the invention has been explained by reference to the disadvantages that commonly arise when the regenerants are sulfuric acid and caustic soda, the invention is equally useful in avoiding similar disadvantages when other regenerants are used, such as ammonia or ammonium sulfate for regenerating the anion resin. In each case it is normal requirement that the regenerant for the anion resin does not penetrate into the cation resin and the regenerant for the cation resin does not penetrate into the anion resin.

I claim:

1. In a vessel for the regeneration of a bed of mixed cation-exchange and anion-exchange exchange resins wherein the bed is formed into layers, the anion layer being above the cation layer, a central device for collecting and distributing regenerant, said device comprising inlet means solely on the upper side for collecting the effluent regenerant of the anion layer at points above the interface between the layers, said inlet means being constituted by strainers that allow liquid but not resin to pass, outlet means solely on the underside for introducing the regenerant of the cation layer at points below the interface, and nonreturn valves controlling all said inlet and outlet means.

2. A vessel according to claim 1 in which the outlet means on the under side are formed by strainers that allow liquid but not resin to pass.

3. A vessel according to claim 1 in which the collecting and distributing device is formed by a grid of pipes with tubular spigots let into their walls, the spigots housing balls that constitute the nonreturn valves.

4. A vessel according to claim 2 in which the spigots are integral with sockets carrying strainers.